US 12,065,378 B2

(12) United States Patent
Huang et al.

(10) Patent No.: US 12,065,378 B2
(45) Date of Patent: Aug. 20, 2024

(54) METHOD FOR PREPARING LOW-BACKGROUND CEMENT

(71) Applicant: China Building Materials Academy Co., Ltd., Beijing (CN)

(72) Inventors: Wen Huang, Beijing (CN); Yang Yu, Beijing (CN); Min Wang, Beijing (CN); Zhaijun Wen, Beijing (CN); Tingting Bao, Beijing (CN); Guang Yao, Beijing (CN); Xin Shen, Beijing (CN); Yun Liu, Beijing (CN); Jing Wang, Beijing (CN); Xianbin Wang, Beijing (CN); Zhongcheng Ma, Beijing (CN); Xianshu Gao, Beijing (CN); Kunyue Zhang, Beijing (CN); Guanbao Tang, Beijing (CN); Suihua Guo, Beijing (CN); Mingming Sun, Beijing (CN); Ao Liu, Beijing (CN)

(73) Assignee: CHINA BUILDING MATERIALS ACADEMY CO., LTD., Beijing (CN)

( * ) Notice: Subject to any disclaimer, the term of this patent is extended or adjusted under 35 U.S.C. 154(b) by 0 days.

(21) Appl. No.: 18/197,028

(22) Filed: May 12, 2023

(65) Prior Publication Data

US 2024/0018048 A1    Jan. 18, 2024

(30) Foreign Application Priority Data

Jul. 15, 2022   (CN) .......................... 202210830777.5

(51) Int. Cl.
*C04B 28/14* (2006.01)
*C04B 7/42* (2006.01)
(Continued)

(52) U.S. Cl.
CPC .............. *C04B 28/14* (2013.01); *C04B 7/424* (2013.01); *C04B 7/44* (2013.01); *C04B 14/4618* (2013.01);
(Continued)

(58) Field of Classification Search
CPC ..... G21F 1/00; G21F 1/02; G21F 1/04; G21F 1/042; G21F 1/047; C04B 7/38;
(Continued)

(56) References Cited

U.S. PATENT DOCUMENTS

| 3,421,703 A | * | 1/1969 | Galer | ..................... G05D 11/00 |
| | | | | 241/34 |
| 7,905,956 B2 | * | 3/2011 | Utagaki | .................. C04B 28/04 |
| | | | | 106/713 |

FOREIGN PATENT DOCUMENTS

| CN | 1034354 A | * | 8/1989 | ............. C04B 28/02 |
| CN | 102285769 A | * | 12/2011 | |

(Continued)

*Primary Examiner* — Matthew R Diaz
(74) *Attorney, Agent, or Firm* — MATTHIAS SCHOLL P.C.; Matthias Scholl

(57) ABSTRACT

A method for preparing low-background cement includes: uniformly mixing a seed crystal of cement, $C_4AF$ whiskers, and high-magnesium raw material to yield a first mixture, calcining the first mixture at 1400-1500° C., to yield a low-background clinker, the first mixture including 1.0-5.0 wt. % of the seed crystal of cement, 1.0-5.0 wt. % of the $C_4AF$ whiskers, and the balance is the high-magnesium raw material; and grinding a second mixture of the low-background clinker and gypsum, to yield low-background cement. The seed crystal of cement is a high-magnesium and low hydration heat clinker, has a specific activity of Ra-226 radioactive nuclides within 50 Bq/kg, and the MgO content of the clinker is between 4.0 wt. % and 5.0 wt. %, with 50

(Continued)

wt. %≤$C_3S$≤55.0 wt. %; and the high-magnesium raw material has a MgO content between 2.5 wt. % and 3.0 wt. %.

6 Claims, 1 Drawing Sheet

(51) Int. Cl.
  *C04B 7/44* (2006.01)
  *C04B 14/46* (2006.01)
  *C04B 22/06* (2006.01)
  *C04B 40/00* (2006.01)
  *G21F 1/04* (2006.01)
  *C04B 111/00* (2006.01)
(52) U.S. Cl.
  CPC ........ *C04B 22/066* (2013.01); *C04B 40/0042* (2013.01); *G21F 1/042* (2013.01); *C04B 2111/00862* (2013.01)
(58) Field of Classification Search
  CPC ........... C04B 7/42; C04B 7/421; C04B 7/424; C04B 7/427; C04B 7/44; C04B 7/48; C04B 7/52; C04B 14/38; C04B 14/383; C04B 14/4618; C04B 14/4625; C04B 14/4631; C04B 22/06; C04B 22/066; C04B 28/14; C04B 40/0039; C04B 40/0042; C04B 2111/00258; C04B 2111/00862
  See application file for complete search history.

(56) References Cited

FOREIGN PATENT DOCUMENTS

| | | | | |
|---|---|---|---|---|
| CN | 102285769 A | | 12/2011 | |
| CN | 104402259 A | | 3/2015 | |
| CN | 111499307 A | * | 8/2020 | ............. C04B 14/28 |
| CN | 111499307 A | | 8/2020 | |
| CN | 112500003 A | | 3/2021 | |
| EP | 2684855 A2 | * | 1/2014 | ............... G21F 1/00 |
| JP | 2013076690 A | | 4/2013 | |
| WO | 9716746 A1 | | 5/1997 | |

* cited by examiner

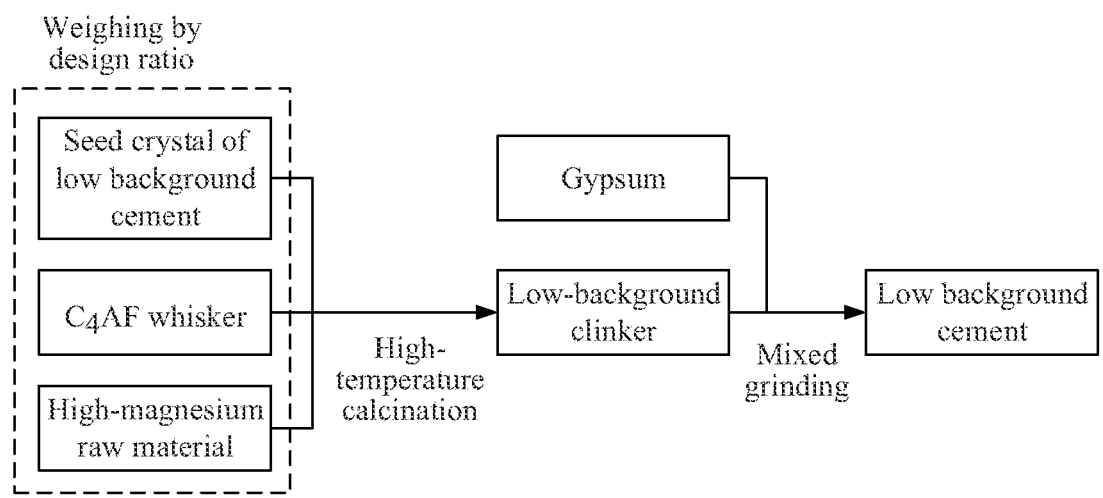

METHOD FOR PREPARING LOW-BACKGROUND CEMENT

CROSS-REFERENCE TO RELATED APPLICATIONS

Pursuant to 35 U.S.C. § 119 and the Paris Convention Treaty, this application claims foreign priority to Chinese Patent Application No. 202210830777.5 filed Jul. 15, 2022, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a method for preparing low-background cement.

Low background underground laboratories are important venues for conducting cutting-edge scientific research on major physics foundations, such as dark matter. They play an important role in shielding against cosmic ray interference and improving the accuracy of experimental research. Low-background herein pertains to having a significantly lower level of inherent, background radiation than usual.

Currently, a few studies have proposed the design of low background concrete mix proportions, which targets at the combination of multiple low background materials, and there is no research on the stable preparation of low background cement.

SUMMARY

To solve the aforesaid problems, the disclosure provides a method for preparing low-background cement, the method comprising:

1) uniformly mixing a seed crystal of cement, $C_4AF$ whiskers, and high-magnesium raw material to yield a first mixture, calcining the first mixture at 1400-1500° C., to yield a low-background clinker, wherein the first mixture comprises 1.0-5.0 wt. % of the seed crystal of cement, 1.0-5.0 wt. % of the $C_4AF$ whiskers, and the balance is the high-magnesium raw material; and
2) grinding a second mixture of the low-background clinker and gypsum to a specific surface area of 320-360 $m^2/kg$, to yield low-background cement.

The seed crystal of cement is a high-magnesium and low hydration heat clinker, has a specific activity of Ra-226 radioactive nuclides within 50 Bq/kg, and a MgO content of the clinker is between 4.0 wt. % and 5.0 wt. %, with 50 wt. %≤$C_3S$≤55.0 wt. %; and the high-magnesium raw material has a MgO content between 2.5 wt. % and 3.0 wt. %, and a specific activity of Ra-226 radioactive nuclides is within Bq/kg.

In a class of this embodiment, the $C_4AF$ whiskers comprise 0.3-2.0 wt. % of free calcium oxide, has a diameter of 0.1-0.3 mm, a length of 5.0-30.0 mm, and a specific activity of Ra-226 radioactive nuclides within 50 Bq/kg.

In a class of this embodiment, the gypsum is natural dihydrate gypsum or desulfurization gypsum, and has a specific activity of Ra-226 radioactive nuclides within 50 Bq/kg.

In a class of this embodiment, a fuel used in 1) for calcination is low-background coal powder, and a specific activity of Ra-226 radioactive nuclides within Bq/kg.

In a class of this embodiment, in 2), a mass ratio of the low-background clinker to the gypsum is 92.0-98.0%: 2.0-8.0%.

The disclosure also provides a low-background cement prepared according to the method.

Materials with high MgO content have lower radioactivity compared to materials with low MgO content. Therefore, the disclosure uses high-magnesium and low hydration heat clinker as a seed crystal of cement, with a MgO content of 4.0 wt. % to 5.0 wt. % and $C_3S$≤55.0 wt. %. In addition, high magnesium raw materials are adopted, and the MgO content is between 2.5 wt. % and 3.0 wt. %.

$C_4AF$ is widely believed to improve the flexural strength and toughness of cement-based materials, while heavy elements such as Fe have certain advantages in radiation shielding. Therefore, based on the nucleation theory, to promote the rapid calcination and crystallization of $C_4AF$ in low-background clinker, $C_4AF$ whiskers are introduced.

The entire preparation process of the low-background cement is monitored for quality control. Therefore, the method of the disclosure poses specific limits on the specific activity of radioactive nuclides in various raw materials, including coal powder in the kiln and gypsum, so as to reduce the difficulty of preparation and control of low-background cement and improving the stability of the specific activity of radioactive nuclides in low-background cement.

Based on the principle of crystal nucleation, the introduction of low-background seed crystal and $C_4AF$ whiskers can reduce the calcination difficulty of low-background clinker and energy consumption, promote the directional formation of the iron phase solid solution in the clinker in the form of whisker, and improve the toughening effect of clinker hydration products and the shielding and absorption effect on rays.

The disclosure specifies the specific activity of radioactive nuclides in different raw materials, and thus achieves stable preparation of low-background cement by controlling and limiting low-background raw materials.

BRIEF DESCRIPTION OF THE DRAWINGS

The disclosure is described hereinbelow with reference to accompanying drawings, in which the sole FIGURE is a flow chart of a method for preparing low-background cement according to one embodiment of the disclosure.

DETAILED DESCRIPTION

To further illustrate the disclosure, embodiments detailing a method for preparing low-background cement are described below. It should be noted that the following embodiments are intended to describe and not to limit the disclosure.

As shown in the sole FIGURE, the disclosure provides a method for preparing low-background cement, the method comprising:

1) uniformly mixing a seed crystal of cement, $C_4AF$ whiskers, and high-magnesium raw material to yield a first mixture, calcining the first mixture at 1400-1500° C., to yield a low-background clinker, wherein the first mixture comprises 1.0-5.0 wt. % of the seed crystal of cement, 1.0-5.0 wt. % of the $C_4AF$ whiskers, and the balance is the high-magnesium raw material; and grinding a second mixture of the low-background clinker and gypsum to a specific surface area of 320-360 $m^2/kg$, to yield low-background cement.

The seed crystal of cement is a high-magnesium and low hydration heat clinker, has a specific activity of Ra-226 radioactive nuclides within 50 Bq/kg, and a MgO content of the clinker is between 4.0 wt. % and 5.0 wt. %, with 50 wt. %≤$C_3S$≤55.0 wt. %; and the high-magnesium raw material has a MgO content between 2.5 wt. % and 3.0 wt. %, and a specific activity of Ra-226 radioactive nuclides is within Bq/kg.

The $C_4AF$ whiskers comprise 0.3-2.0 wt. % of free calcium oxide, has a diameter of 0.1-0.3 mm, a length of 5.0-30.0 mm, and a specific activity of Ra-226 radioactive nuclides within 50 Bq/kg.

The gypsum is natural dihydrate gypsum or desulfurization gypsum, and has a specific activity of Ra-226 radioactive nuclides within 50 Bq/kg.

The fuel used in 1) for calcination is low-background coal powder, and a specific activity of Ra-226 radioactive nuclides within 50 Bq/kg.

In 2), a mass ratio of the low-background clinker to the gypsum is 92.0-98.0%: 2.0-8.0%.

Also provided is the low-background cement prepared according to the aforesaid method.

Example 1

A method for preparing low-background cement is implemented as follows. 1 wt. % of low-background seed crystal of cement, 1 wt. % of $C_4AF$ whiskers, and 98 wt. % of high magnesium raw material were evenly mixed, and calcined at 1400° C. to obtain low-background clinker. The seed crystal of cement was a high-magnesium and low hydration heat clinker comprising 4.0% of MgO and 53% of $C_3S$; the $C_4AF$ whiskers comprised 0.7% of free calcium oxide, has a diameter of 0.1 mm, a length of 5.0 mm. The high-magnesium raw material had a MgO content of 2.5 wt. %. Then, according to the mass percentage: 92% low-background clinker and 8% gypsum were mixed and ground to yield low-background cement. The nuclide content of the components of the low-background cement in this example is shown in Table 1. The physical properties and nuclide (Ra-226) content of the low-background cement in this example are shown in Table 2.

Example 2

A method for preparing low-background cement is implemented as follows. 2 wt. % of low-background seed crystal of cement, 3 wt. % of $C_4AF$ whiskers, and 95 wt. % of high magnesium raw material were evenly mixed, and calcined at 1450° C. to obtain low-background clinker. The seed crystal of cement was a high-magnesium and low hydration heat clinker comprising 4.5 wt. % of MgO and 52.0 wt. % of $C_3S$; the $C_4AF$ whiskers comprised 0.5% of free calcium oxide, has a diameter of 0.2 mm, a length of 20.0 mm. The high-magnesium raw material had a MgO content of 2.5 wt. %. Then, according to the mass percentage: 95% low-background clinker and 5% gypsum were mixed and ground to yield low-background cement. The nuclide content of the components of the low-background cement in this example is shown in Table 1. The physical properties and nuclide (Ra-226) content of the low-background cement in this example are shown in Table 2.

Example 3

A method for preparing low-background cement is implemented as follows. 3 wt. % of low-background seed crystal of cement, 2 wt. % of $C_4AF$ whiskers, and 95 wt. % of high magnesium raw material were evenly mixed, and calcined at 1450° C. to obtain low-background clinker. The seed crystal of cement is a high-magnesium and low hydration heat clinker comprising 4.5 wt. % of MgO and 53.0 wt. % of $C_3S$; the $C_4AF$ whiskers comprised 0.6% of free calcium oxide, has a diameter of 0.2 mm, a length of 15.0 mm. The high-magnesium raw material had a MgO content of 3.0 wt. %. Then, according to the mass percentage: 95% low-background clinker and 5% gypsum were mixed and ground to yield low-background cement. The nuclide content of the components of the low-background cement in this example is shown in Table 1. The physical properties and nuclide (Ra-226) content of the low-background cement in this example are shown in Table 2.

Example 4

A method for preparing low-background cement is implemented as follows. 5 wt. % of low-background seed crystal of cement, 5 wt. % of $C_4AF$ whiskers, and 90 wt. % of high magnesium raw material were evenly mixed, and calcined at 1500° C. to obtain low-background clinker. The seed crystal of cement is a high-magnesium and low hydration heat clinker comprising 4.0 wt. % of MgO and 54.0 wt. % of $C_3S$; the $C_4AF$ whiskers comprised 0.8% of free calcium oxide, has a diameter of 0.3 mm, a length of 30.0 mm. The high-magnesium raw material had a MgO content of 2.5 wt. %. Then, according to the mass percentage: 98% low-background clinker and 2% gypsum were mixed and ground to yield low-background cement. The nuclide content of the raw materials of the low-background cement in this example is shown in Table 1. The physical properties and nuclide (Ra-226) content of the low-background cement in this example are shown in Table 2.

TABLE 1

Nuclide content of raw materials of low-background cement

|  | Seed crystal of cement | $C_4AF$ whiskers | High-magnesium raw material | Dihydrate gypsum | Coal powder |
|---|---|---|---|---|---|
| Example 1 | 47.9 | 32.1 | 15.6 | 13.4 | 32.1 |
| Example 2 | 45.7 | 26.4 | 11.7 | 10.1 | 24.3 |
| Example 3 | 46.2 | 26.7 | 12.0 | 10.3 | 24.7 |
| Example 4 | 48.2 | 34.5 | 13.8 | 11.8 | 28.9 |

TABLE 2

Physical properties and nuclide (Ra-226) content of low-background cement

| | Flexural Strength | | | Compressive strength | | | Radioactive nuclides (Ra-226) |
|---|---|---|---|---|---|---|---|
| | 3 d | 7 d | 28 d | 3 d | 7 d | 28 d | Bq/kg |
| Example 1 | 5.7 | 6.5 | 7.9 | 26.8 | 32.4 | 48.0 | 44.76 |
| Example 2 | 5.8 | 7.2 | 8.3 | 28.7 | 41.2 | 52.9 | 39.08 |
| Example 3 | 5.6 | 6.9 | 8.0 | 27.9 | 39.0 | 50.3 | 40.08 |
| Example 4 | 4.8 | 6.1 | 7.5 | 22.7 | 31.0 | 45.0 | 42.92 |

It will be obvious to those skilled in the art that changes and modifications may be made, and therefore, the aim in the appended claims is to cover all such changes and modifications.

What is claimed is:

1. A method for preparing cement, the method comprising:
   1) uniformly mixing a seed crystal of cement, $C_4AF$ whiskers, and high-magnesium raw material to yield a first mixture and calcining the first mixture at 1400-1500° C. to yield a first clinker, wherein the first mixture comprises 1.0-5.0 wt. % of the seed crystal of cement, 1.0-5.0 wt. % of the $C_4AF$ whiskers; and
   2) grinding a second mixture of the first clinker and gypsum to a specific surface area of 320-360 $m^2$/kg to yield a cement;

wherein:
   the seed crystal of cement is a second clinker and has a specific activity of Ra-226 radioactive nuclides within 50 Bq/kg, and a MgO content of the second clinker is between 4.0 wt. % and 5.0 wt. %, with 50 wt. %≤$C_3S$≤55.0 wt. %; and
   the high-magnesium raw material has a MgO content between 2.5 wt. % and 3.0 wt. % and a specific activity of Ra-226 radioactive nuclides is within 40 Bq/kg.

2. The method of claim 1, wherein the $C_4AF$ whiskers comprise 0.3-2.0 wt. % of free calcium oxide, a diameter of 0.1-0.3 mm, a length of 5.0-30.0 mm, and a specific activity of Ra-226 radioactive nuclides within 50 Bq/kg.

3. The method of claim 1, wherein the gypsum is natural dihydrate gypsum or desulfurization gypsum and has a specific activity of Ra-226 radioactive nuclides within 50 Bq/kg.

4. The method of claim 1, wherein a fuel used in 1) for calcination is coal powder and has a specific activity of Ra-226 radioactive nuclides within 50 Bq/kg.

5. The method of claim 1, wherein in 2), a mass ratio of the first clinker to the gypsum is 92.0-98.0%: 2.0-8.0%.

6. A cement prepared by the method according to claim 1.

* * * * *